(12) United States Patent
Sun

(10) Patent No.: US 11,063,262 B2
(45) Date of Patent: Jul. 13, 2021

(54) ANODE AND ELECTOCHEMICAL APPARATUS AND ELECTRONIC APPARATUS USING THE ANODE

(71) Applicant: NINGDE AMPEREX TECHNOLOGY LIMITED, Ningde (CN)

(72) Inventor: Yuwei Sun, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 205 days.

(21) Appl. No.: 16/294,057

(22) Filed: Mar. 6, 2019

(65) Prior Publication Data

US 2020/0194796 A1    Jun. 18, 2020

(30) Foreign Application Priority Data

Dec. 14, 2018  (CN) .......................... 201811534070.X

(51) Int. Cl.
| | |
|---|---|
| *H01M 4/66* | (2006.01) |
| *H01M 4/134* | (2010.01) |
| *H01M 4/38* | (2006.01) |
| *H01M 10/0525* | (2010.01) |
| *H01M 4/02* | (2006.01) |
| *H01M 4/62* | (2006.01) |

(52) U.S. Cl.
CPC .......... *H01M 4/667* (2013.01); *H01M 4/134* (2013.01); *H01M 4/386* (2013.01); *H01M 4/625* (2013.01); *H01M 4/661* (2013.01); *H01M 10/0525* (2013.01); *H01M 2004/027* (2013.01); *H01M 2220/30* (2013.01)

(58) Field of Classification Search
CPC ...... H01M 4/134; H01M 4/366; H01M 4/386; H01M 4/483; H01M 4/587; H01M 4/625; H01M 4/661; H01M 4/663; H01M 4/667; H01M 10/0525; H01M 2004/0027; H01M 2004/021; H01M 2220/30
See application file for complete search history.

(56) References Cited

U.S. PATENT DOCUMENTS

| | | | |
|---|---|---|---|
| 6,420,070 B1 | 7/2002 | Kasamatsu et al. | |
| 2003/0054249 A1* | 3/2003 | Yamamoto | ............ H01M 4/139 429/231.1 |
| 2016/0204422 A1 | 7/2016 | Wang et al. | |
| 2019/0123358 A1* | 4/2019 | Kudo | ...................... H01M 4/78 |
| 2019/0348667 A1* | 11/2019 | Kang | ................ H01M 10/0525 |

FOREIGN PATENT DOCUMENTS

| | | |
|---|---|---|
| CN | 102769121 A | 11/2012 |
| CN | 102842701 A | 12/2012 |
| CN | 103515573 A | 1/2014 |
| CN | 103633293 A | 3/2014 |
| CN | 103782420 A | 5/2014 |
| CN | 104106160 A | 10/2014 |
| CN | 107528044 A | 12/2017 |
| CN | 107710467 A | 2/2018 |
| CN | 108140810 A | 6/2018 |
| CN | 108847489 A | 11/2018 |
| CN | 108963187 A | 12/2018 |
| EP | 3565034 A1 | 11/2019 |
| JP | 2018078021 A | 5/2018 |

OTHER PUBLICATIONS

Extended European Search Report, dated May 7, 2020, in counterpart European application 19178251.5-1103, 11 pages.
Chinese First Office Action, dated Mar. 4, 2020, in counterpart Chinese application 201811534070.X, 6 pages in Chinese.
Chinese Second Office Action and Supplementary Search Report, dated Jul. 22, 2020, in counterpart Chinese application 201811534070.X, 5 pages in Chinese.

* cited by examiner

*Primary Examiner* — Anca Eoff
(74) *Attorney, Agent, or Firm* — Juan Carlos A. Marquez; Marquez IP Law Office, PLLC

(57) ABSTRACT

The present application relates to an anode and an electrochemical apparatus and an electronic apparatus using the anode. Specifically, the present application provides an anode, comprising a substrate, an active material layer and a carbon coating layer between the substrate and the active material layer, wherein an X-ray diffraction pattern of the carbon coating layer comprises a 004 diffraction pattern and a 110 diffraction pattern, a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15. The anode of the present application has less wrinkling and bending, so as to reduce the deformation problem of a battery cell.

16 Claims, 4 Drawing Sheets

ANODE AND ELECTROCHEMICAL APPARATUS AND ELECTRONIC APPARATUS USING THE ANODE

CROSS REFERENCE TO RELATED APPLICATIONS

The present application claims the benefit of priority from the China Patent Application No. 201811534070.X, filed on 14 Dec. 2018, the disclosure of which is hereby incorporated by reference in its entirety.

BACKGROUND

1. Technical Field

The present application relates to the field of energy storage, specifically relates to an anode and an electrochemical apparatus and an electronic apparatus using the anode, in particular, in a lithium ion battery.

2. Description of the Related Art

With the widespread use of electronic devices such as cameras, digital video cameras, mobile phones and notebook computers, people have an increasing performance requirement for electrochemical apparatus (e.g., lithium ion batteries). Lithium ion batteries have been widely used in various fields due to their high energy density, long cycle life, no memory effect and the like. A traditional lithium ion battery usually uses a silicon material as an anode current collector and uses a graphite material as an anode active material. However, in the use of the lithium ion battery, the use of traditional silicon materials and graphite materials may encounter multiple problems, such as the easy occurrence of wrinkling in an anode and the easy deformation of a battery cell.

In view of this, it is definitely necessary to provide an improved anode and an electrochemical apparatus and an electronic apparatus using the anode.

SUMMARY

Embodiments of the present application solve at least one problem in the related art at least to a certain extent by providing an anode and an electrochemical apparatus and an electronic apparatus using the anode.

In one embodiment, the present application provides an anode, comprising a substrate, an active material layer and a carbon coating layer between the substrate and the active material layer, wherein an X-ray diffraction pattern of the carbon coating layer includes a 004 diffraction pattern and a 110 diffraction pattern, a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15.

According to some embodiments of the present application, the substrate has a tensile strength of greater than about 400 MPa and an elongation of less than about 2%.

According to some embodiments of the present application, the carbon coating layer is selected from natural graphite, artificial graphite, hard carbon, soft carbon or a combination thereof.

According to some embodiments of the present application, the substrate is selected from copper, nickel, a copper alloy, a nickel alloy or a combination thereof.

According to some embodiments of the present application, the active material layer is a silicon active material layer.

According to some embodiments of the present application, the silicon active material layer includes not less than about 0.1 w % of silicon.

In another embodiment, the present application provides an electrochemical apparatus, comprising a cathode and the anode according to the embodiments of the present application.

In another embodiment, the present application provides an electronic apparatus, including the electrochemical apparatus according to the embodiments of the present application.

Additional aspects and advantages of the embodiments of the present application will be partially described, reflected or explained through the implementation of the embodiments of the present application in the subsequent descriptions.

BRIEF DESCRIPTION OF THE DRAWINGS

The following will briefly introduce the drawings required for describing the embodiments of the present application or the prior art so as to facilitate the description of the embodiments of the present application. Obviously, the drawings in the following descriptions are only part of the embodiments in the present application. Those skilled in the art still can obtain drawings of other embodiments according to structures illustrated in these drawings without creative efforts.

DETAILED DESCRIPTION

Embodiments of the present application will be described in detail below. The embodiments of the present application shall not be explained as limitations to the present application.

As used herein, the term "about" in the present application is used for describing and explaining a small change. When being used in combination with an event or a situation, the term may refer to an example where the event or situation occurs accurately and an example where the event or situation occurs extremely similarly. For example, when being used in combination with a value, the term may refer to a varying range less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1% and less than or equal to ±0.05%. In addition, the amount, the ratio and other values are sometimes shown in the range format in the present application. It should be understood that such range format is used for convenience and brevity and is to be understood in a flexible manner as not only including values that are explicitly specified as the limits of the range, but also including all individual values or sub-ranges that are covered in the range, as clearly stating each value and each sub-range.

I. Anode

Figure 1:
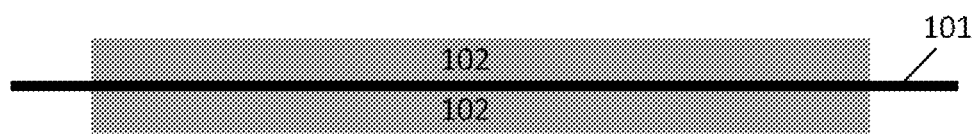
FIG. 1 shows a schematic diagram of an anode according to the prior art.

At the present, silicon material has been widely used as an active material of an anode to increase the energy of a lithium ion battery. Usually, the silicon material is mixed with graphite to prepare a silicon mixture which is then stirred to form an anode slurry, followed by coating the anode slurry onto a substrate (i.e., an anode current collector) (as shown by 101 in FIG. 1) to form a silicon mixture active material layer (as shown by 102 in FIG. 1). However, dramatic volume expansion, particularly expansion in an X/Y direction (i.e., the horizontal direction), can easily occur in the silicon material during the circulation of the lithium ion battery. The X/Y-directional expansion of the anode active material layer can easily be transmitted to the substrate, leading to wrinkling and bending of the anode and thus resulting in deformation of the battery cell structure.

Figure 2:
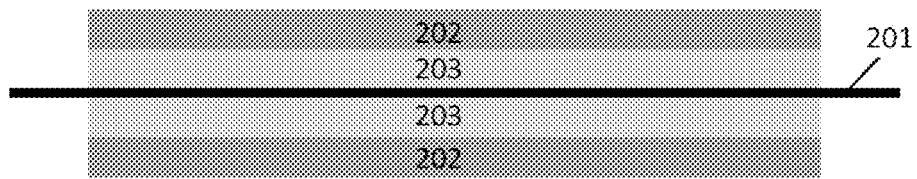
FIG. 2 shows a schematic diagram of an anode according to an embodiment of the present application.

To solve the above problem, as shown in FIG. 2, the present application provides an anode, comprising a substrate 201, an active material layer 202 and a carbon coating layer 203 between the substrate and the active material layer, wherein an X-ray diffraction pattern of the carbon coating layer includes a 004 diffraction pattern and a 110 diffraction pattern, a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15.

The inventors of the present application found that the OI value may reflect the orientation of the carbon coating layer. The larger the OI value is, the higher the anisotropism of the carbon coating layer is. During the circulation of the lithium ion battery, the carbon coating layer having a high OI value tends to generate expansion between layers, i.e., expansion in the Z direction (the vertical direction), and does not easily generate expansion in the X/Y direction. Applying the carbon coating layer having a high OI value to the substrate and the active material layer (for example, the silicon active material layer) so that the carbon coating layer and the active material layer are embedded together can not only ensure the bonding force between two layers, but also allow the carbon coating layer to have certain sliding capacity. Such a structure may result in the X/Y expansion of the silicon active material layer not being transmitted to the substrate. As an X/Y expansion force subjected by the substrate during the circulation of the lithium ion battery is reduced, the X/Y elongation of the substrate is decreased, thereby improving on the problems of wrinkling and bending of the anode and improving on the problem of deformation of the battery cell.

The substrate used in a traditional anode usually has a relatively low tensile strength or relatively high elongation. Therefore, the traditional substrate usually has a relatively high elongation in the X/Y direction, which is usually greater than about 0.5%. The relatively high X/Y-directional elongation easily causes wrinkling of the anode and deformation of the battery cell.

To solve this problem, in some embodiments of the present application, the traditional substrate is further replaced by a high-strength substrate to allow the substrate to elongate to an extremely small degree during the circulation of the lithium ion battery, so as to improve on the problems of the wrinkling of the anode, the deformation of the battery cell and the like.

According to some embodiments of the present application, the substrate has a tensile strength of greater than about 400 MPa. According to some other embodiments of the present application, the substrate has an elongation of less than about 2%.

According to some embodiments of the present application, the carbon coating layer is selected from natural graphite, artificial graphite, hard carbon, soft carbon or a combination thereof.

According to some embodiments of the present application, the OI value of the carbon coating layer is greater than about 13.

According to some embodiments of the present application, the substrate is selected from copper, nickel, a copper alloy, a nickel alloy or a combination thereof.

According to some embodiments of the present application, the active material layer is a silicon active material layer.

According to some embodiments of the present application, the silicon active material layer includes not less than about 0.1 w % of silicon.

According to some embodiments of the present application, a silicon active material includes, but not limited to, pure silicon, a silicon-carbon compound, a silicon-oxygen compound, a silicon alloy, a silicon coating or a combination thereof.

II. Cathode

A material capable of being applied to a cathode in the embodiment of the present application, a constitution and a manufacturing method thereof include any technologies disclosed in the prior art. In some embodiments, the cathode is a cathode disclosed in the U.S. Pat. No. 9,812,739B, which is incorporated into the present application by reference of its entirety.

In some embodiments, the cathode includes a current collector and a cathode active material layer located on the current collector. The cathode active material includes at least one lithiation intercalation compound for reversibly embedding and de-embedding lithium ions. In some embodiments, the cathode active material includes a composite oxide. In some embodiments, the composite oxide contains lithium and at least one element selected from cobalt, manganese and nickel.

In some embodiments, the cathode active material includes, but is not limited to:

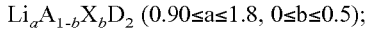 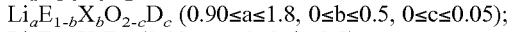 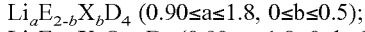 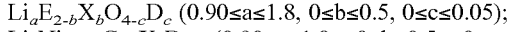 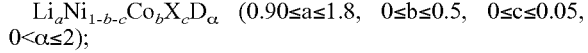 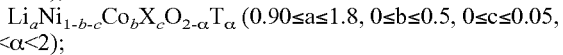 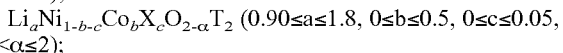 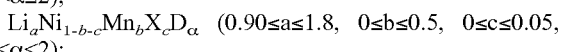 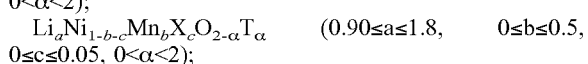

$Li_aA_{1-b}X_bD_2$ ($0.90 \leq a \leq 1.8$, $0 \leq b \leq 0.5$);
$Li_aE_{1-b}X_bO_{2-c}D_c$ ($0.90 \leq a \leq 1.8$, $0 \leq b \leq 0.5$, $0 \leq c \leq 0.05$);
$Li_aE_{2-b}X_bD_4$ ($0.90 \leq a \leq 1.8$, $0 \leq b \leq 0.5$);
$Li_aE_{2-b}X_bO_{4-c}D_c$ ($0.90 \leq a \leq 1.8$, $0 \leq b \leq 0.5$, $0 \leq c \leq 0.05$);
$Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$);
$Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$);
$Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$);
$Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$);
$Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$);

$Li_aNi_{1-b-c}Mn_bX_cO_{2-\alpha}T_2$ (0.90≤a≤1.8, 0≤b≤0.5, 0≤c≤0.05, 0<α<2);
$Li_aNi_bE_cG_dO_2$ (0.90≤a≤1.8, 0≤b≤0.9, 0≤c≤0.5, 0.001≤d≤0.1);
$Li_aNi_bCo_cMn_dG_eO_2$ (0.90≤a≤1.8, 0≤b≤0.9, 0≤c≤0.5, 0≤d≤0.5, 0.001≤e≤0.1);
$Li_aN_bG_bO_2$ (0.90≤a≤1.8, 0.001≤b≤0.1);
$Li_aCoG_bO_2$ (0.90≤a≤1.8, 0.001≤b≤0.1);
$Li_aMnG_bO_2$ (0.90≤a≤1.8, 0.001≤b≤0.1);
$Li_aMn_2G_bO_4$ (0.90≤a≤1.8, 0.001≤b≤0.1);
$QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2) or $LiFePO_4$;

wherein A is selected from Ni, Co, Mn and any combination thereof; X is selected from Al, Ni, Co, Mn, Cr, Fe, Mg, Sr, V, rare earth elements and any combination thereof; D is selected from O, F, S, P and any combination thereof; E is selected from Co, Mn and any combination thereof; T is selected from F, S, P and any combination thereof; G is selected from Al, Cr, Mn, Fe, Mg, La, Ce, Sr, V and any combination thereof; Q is selected from Ti, Mo, Mn and any combination thereof; I is selected from Cr, V, Fe, Sc, Y and any combination thereof; and J is selected from V, Cr, Mn, Co, Ni, Cu and any combination thereof.

In some embodiments, the cathode active material is selected from lithium cobalt oxide ($LiCoO_2$), a lithium Ni—Co—Mn (NCM) ternary material, lithium iron phosphate ($LiFePO_4$), lithium manganate ($LiMn_2O_4$) or any combination thereof.

In some embodiments, the cathode active material may have a coating layer on the surface, or may be mixed with another compound having a coating layer. The coating layer may include at least one coating element compound selected from oxide of a coating element, hydroxide of the coating element, oxyhydroxide of the coating element, a carbonate oxygen salt of the coating element and hydroxycarbonate of the coating element. The compound for coating may be amorphous or crystalline.

In some embodiments, the coating element contained in the coating layer may include Mg, Al, Co, K, Na, Ca, Si, Ti, V, Sn, Ge, Ga, B, As, Zr and any combination thereof. The coating layer may be applied by any methods as long as the method does not have adverse effects on the performance of the cathode active material. For example, the method may include any coating methods known in the art, such as spraying and impregnation.

The cathode active material layer further includes an adhesive, and optionally includes a conductive material. The adhesive enhances the combination between particles of the cathode active material and also enhances the combination between the cathode active material and the current collector.

In some embodiments, the adhesive includes, but is not limited to: polyvinyl alcohol, hydroxy propyl cellulose, diacetyl cellulose, polyvinyl chloride, carboxylated polyvinyl chloride, polyvinyl fluoride, an ethylidene oxygen-containing polymer, polyvinylpyrrolidone, polyurethane, polytetrafluoroethylene, 1,1-polyvinylidene fluoride, polyethylene, polypropylene, butadiene styrene rubber, acrylic butadiene styrene rubber, epoxy resin, nylon and the like.

In some embodiments, the conductive material includes, but is not limited to: a carbon-based material, a metal-based material, a conductive polymer and mixtures thereof. In some embodiments, the carbon-based material is selected from natural graphite, artificial graphite, carbon black, acetylene black, Ketjen black, carbon fibre or any combination thereof. In some embodiments, the metal-based material is selected from metal powder, metal fibre, copper, nickel, aluminum and silver. In some embodiments, the conductive polymer is a polyphenylene derivative.

In some embodiments, the current collector may be, but is not limited to, aluminum.

The cathode may be prepared by a preparation method known in the art. For example, the cathode may be obtained by the following method: the active material, the conductive material and the adhesive are mixed in a solvent to prepare an active material composition, and the current collector is coated with the active material composition. In some embodiments, the solvent may include, but is not limited to, N-methyl pyrrolidone.

III. Electrolyte Solution

An electrolyte solution capable of being used in the embodiment of the present application may be an electrolyte solution known in the prior art. An electrolyte capable of being used in the electrolyte solution of the embodiments of the present application includes, but is not limited to: inorganic lithium salt, such as $LiClO_4$, $LiAsF_6$, $LiPF_6$, $LiBF_4$, $LiSbF_6$, $LiSO_3F$ and $LiN(FSO_2)_2$; fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, ringlike 1,3-lithium hexafluoropropane disulfonimide, ringlike 1,2-lithium tetrafluoroethane disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; and dicarboxylic acid complex-containing lithium salt, such as bi(oxalate synthesized) lithium borate, difluorooxalate synthesized lithium borate, tri(oxalate synthesized) lithium phosphate, difluoro-bi(oxalate synthesized) lithium phosphate, tetrafluoro(oxalate synthesized) lithium phosphate and the like. In addition, one of the above-mentioned electrolytes may be independently used, or two or more of the above-mentioned electrolytes may be used simultaneously. For example, in some embodiments, the electrolyte includes a combination of $LiPF_6$ and $LiBF_4$. In some embodiments, the electrolyte includes a combination of the inorganic lithium salt such as the $LiPF_6$ or the $LiBF_4$ and the fluorine-containing organic lithium salt such as $LiCF_3SO_3$, $LiN(CF_3SO_2)_2$ and $LiN(C_2F_5SO_2)_2$. In some embodiments, the concentration of the electrolyte is within a range of about 0.8 mol/L to about 3 mol/L, such as a range of about 0.8 mol/L to about 2.5 mol/L, a range of about 0.8 mol/L to about 2 mol/L and a range of about 1 mol/L to about 2 mol/L. For another example, the concentration is about 1 mol/L, about 1.15 mol/L, about 1.2 mol/L, about 1.5 mol/L, about 2 mol/L or about 2.5 mol/L.

IV. Separator

In some embodiments, a separator is arranged between the cathode and the anode to prevent a short circuit. There are no special limitations to the material and the shape of the separator used in the embodiments of the present application, and the separator may be any technologies disclosed in the prior art. In some embodiments, the separator includes a polymer or an inorganic substance and the like formed by a material stable in the electrolyte solution of the present application.

For example, the separator may include a substrate layer and a surface treatment layer. The substrate layer is nonwoven cloth, a membrane or a composite membrane having a porous structure, and is made of at least one of polyethylene, polypropylene, polyethylene glycol terephthalate and polyimide. Specifically, a polypropylene porous membrane, a polyethylene porous membrane, polypropylene nonwoven cloth, polyethylene nonwoven cloth or a polypropylene-polyethylene-polypropylene porous composite membrane can be adopted.

The surface treatment layer is arranged on at least one surface of the substrate layer, and may be a polymer layer or an inorganic substance layer, or may be a layer formed by mixing the polymer and the inorganic substance.

The inorganic substance layer includes inorganic particles and an adhesive. The inorganic particle is selected from one or a combination of several of aluminum oxide, silicon oxide, magnesium oxide, titanium oxide, hafnium oxide, tin oxide, ceric oxide, nickel oxide, zinc oxide, calcium oxide, zirconium oxide, yttrium oxide, silicon carbide, boehmite, aluminum hydroxide, magnesium hydroxide, calcium hydroxide and barium sulphate. The adhesive is one or a combination of several of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinylether, polymethyl methacrylate, polytetrafluoroethylene and polyhexafluoropropylene.

The polymer layer includes a polymer, and the material of the polymer is selected from at least one of polyamide, polyacrylonitrile, an acrylate polymer, polyacrylic acid, polyacrylate, polyvinylpyrrolidone, polyvinylether, polyvinylidene fluoride and poly(vinylidene fluoride-hexafluoropropylene).

V. Electrochemical Apparatus

The electrochemical apparatus of the present application includes any apparatuses capable of generating electrochemical reactions. Specific examples of the electrochemical apparatus include all types of primary barriers, secondary barriers, fuel batteries, solar batteries or capacitors. Particularly, the electrochemical apparatus is a lithium secondary battery, including a lithium metal secondary battery, a lithium ion secondary battery, a lithium polymer secondary battery or a lithium ion polymer secondary battery. In some embodiments, the electrochemical apparatus of the present application includes a cathode having a cathode active material capable of absorbing and releasing metal ions; an anode according to the embodiments of the present application; an electrolyte solution; and a separator arranged between the cathode and the anode.

VI. Electronic Apparatus

There are no special limitations to the use of the electrochemical apparatus of the present application, and the electrochemical apparatus may be applied to any electronic apparatuses known in the prior art. In one embodiment, the electrochemical apparatus of the present application may be applied to, but is not limited to, a notebook computer, a pen input type computer, a mobile computer, an e-book player, a portable phone, a portable fax machine, a portable copying machine, a portable printing machine, a head-mounted stereo headphone, a video tape recorder, a liquid crystal television set, a hand-held cleaner, a portable CD machine, a mini optical disk, a transceiver, an electronic notebook, a calculator, a memory card, a portable sound recorder, a radio receiver, a backup power supply, a motor, an automobile, a motorcycle, a power-assisted bicycle, a bicycle, a lighting device, a toy, a game machine, a clock, an electric tool, a flashlight, a camera, a household large-sized storage battery, a lithium ion capacitor and the like.

A lithium ion battery is taken as an example below, and the preparation of the lithium ion battery is described in combination with specific embodiments. Those skilled in the art will understand that preparation methods described in the present application are only examples, and any other proper preparation methods shall all fall within the scope of the present application.

EMBODIMENTS

Embodiments and comparative embodiments of the lithium ion battery according to the present application are described below for performance estimation.

I. Preparation of the Lithium Ion Battery

1. Preparation of an Anode

Graphite, a conductive agent (conductive carbon black, Super P) and an adhesive (sodium carboxymethyl cellulose, CMC) were mixed in a mass ratio of 97%:1%:2% to prepare a graphite slurry; an anode current collector was coated with the prepared graphite slurry to prepare a graphite coating layer; the graphite coating layer was coated with a silicon mixture to prepare an anode membrane; and the prepared anode membrane was subjected to cold pressing so that it had a compaction density of 1.8 g/cc, so as to obtain the anode.

2. Preparation of a Cathode

Lithium cobalt oxide, conductive carbon black and polyvinylidene fluoride were mixed in a mass ratio of 97%:1%:1% to prepare a cathode slurry; an aluminum foil of a cathode current collector was coated with the prepared cathode slurry to prepare a cathode membrane; and the prepared cathode membrane was subjected to cold pressing so that it had a compaction density of 4.15 g/cc, so as to obtain the cathode.

3. Preparation of an Electrolyte Solution

Under a dry argon environment, $LiPF_6$ was added into a solvent prepared by mixing EC, PC and DEC (in a weight ratio of 1:1:1) and uniformly mixed so that $LiPF_6$ had a concentration of 1.15 mol/L, so as to obtain the electrolyte solution.

4. Preparation of a Separator

A PE porous thin membrane polymer was used as the separator.

5. Preparation of the Lithium Ion Battery

The anode and the cathode were respectively cut into required widths and lengths, welded with tabs and wound to form a naked battery cell. The naked battery cell was packaged and baked, injected with the electrolyte solution, and then was stood at room temperature for 24 hours and was then stood at 60° C. for 12 hours. The lithium ion battery was prepared by the procedures such as formation and capacity.

II. Test Methods

1. Test Method of an OI Value

A 004 diffraction pattern and a 110 diffraction pattern in an X-ray diffraction pattern of a carbon coating layer in the anode were tested in accordance with *Method for Determination of Lattice Parameters of Artificial Graphite* of the Machinery Industry Standard JB/T 4220-2011 of the People's Republic of China. Test conditions were as follows: X ray adopted $CuK_\alpha$ radiation which was filtered out through a filter or a monochromator; the working voltage of an X-ray tube was (30-35) kV, and the working current was (15-20) mA; the scanning speed of a counter was ¼ (°)/min; during recording of the 004 diffraction pattern, the scanning range of a diffraction angle 2θ was 53-57 degrees; during recording of the 110 diffraction pattern, the scanning range of the diffraction angle 2θ was 75-79 degrees; the c-axial length of a unit crystal cell length obtained from the 004 diffraction pattern was recorded as C004; and the a-axial length of a unit crystal cell length obtained from the 110 diffraction pattern was recorded as C110. The OI value was calculated through the following formula:

OI value=C004/C110

2. Test Method of the Elongation of the Anode

The widths of a substrate of the anode before and after the circulation of the lithium ion battery were measured respectively. The elongation of the substrate at the end of the circulation was calculated through the following formula:

X/Y elongation of the substrate=the width of the substrate after the circulation/the width of the substrate before the circulation−1

Z elongation of the substrate=the thickness of the substrate after the circulation/the thickness of the substrate before the circulation−1

3. Test Method of the Elongation of the Graphite Layer

The widths of the graphite layer before and after the circulation of the lithium ion battery were measured respectively. The elongation of the graphite layer at the end of the circulation was calculated through the following formula:

X/Y elongation of the graphite layer=the width of the graphite layer after the circulation/the width of the graphite layer before the circulation−1

Z elongation of the graphite layer=the thickness of the graphite layer after the circulation/the thickness of the graphite layer before the circulation−1

4. Test Method of the Tensile Strength

The tensile strength of the substrate of the anode was tested in accordance with methods from the *Electrolytic Copper Foil* of the National Standard GB/T 5230-1995 of the People's Republic of China. Test conditions were as follows: a test sample having a certain length was taken, and a cross sectional area $S_0$ of the test sample was measured; a test machine stretched the test sample at a speed of 50 mm/min till the test sample was broken; and a maximum load $F_b$ was read from a force measurement plate or a tensile curve. The tensile strength $\sigma_b$ was calculated according to the following formula:

$\sigma_b = F_b/S_0$

5. Test Method of the Elongation

The elongation of the substrate of the anode was tested in accordance with methods from the *Electrolytic Copper Foil* of the National Standard GB/T 5230-1995 of the People's Republic of China. Test conditions were as follows: a test sample having a certain length was taken, and two marks were made on the test sample; a distance between the two mark lines was recorded as $L_0$; the test machine stretched the test sample at a speed of 50 mm/min until the test sample was broken; and the distance between the two marked lines after the test sample was broken was measured and recorded as $L_1$. The elongation δ was calculated according to the following formula:

δ=[(L1−L0)/L0]×100%

III. Test Results

Figure 3:
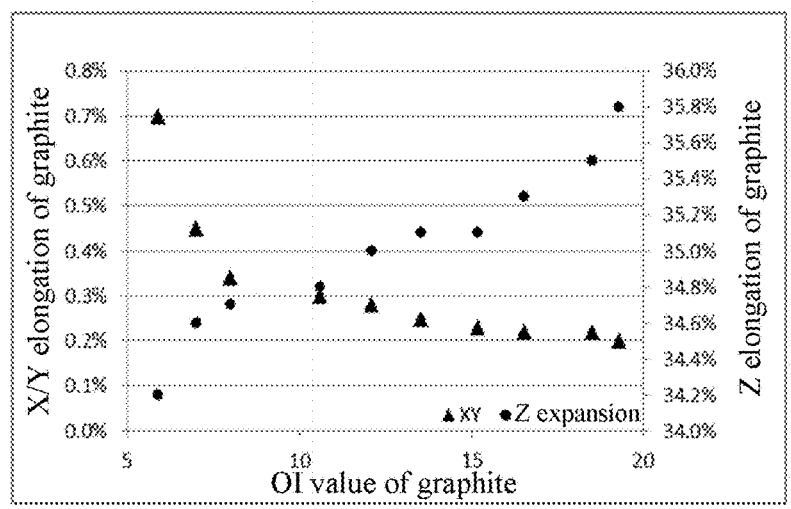
FIG. 3 shows X/Y and Z elongations of graphite having different OI values at the end of circulation of a lithium ion battery under a compaction density of 1.8 g/cc of the anode.

Table 1 and FIG. 3 show the OI values of different graphite materials before and after circulation and the X/Y and Z elongations of graphite layers made of the materials.

TABLE 1

| | OI value before circulation | OI value after circulation | X/Y elongation | Z elongation |
|---|---|---|---|---|
| Graphite 1 | 19.3 | 13.2 | 0.20% | 35.80% |
| Graphite 2 | 18.55 | 11.1 | 0.22% | 35.50% |

TABLE 1-continued

| | OI value before circulation | OI value after circulation | X/Y elongation | Z elongation |
|---|---|---|---|---|
| Graphite 3 | 16.55 | 10.9 | 0.22% | 35.30% |
| Graphite 4 | 15.2 | 10.4 | 0.23% | 35.10% |
| Graphite 5 | 13.53 | 9.8 | 0.25% | 35.10% |
| Graphite 6 | 12.1 | 8.6 | 0.28% | 35.00% |
| Graphite 7 | 10.6 | 7.2 | 0.30% | 34.80% |
| Graphite 8 | 8.0 | 5.6 | 0.34% | 34.70% |
| Graphite 9 | 7.0 | 4.7 | 0.45% | 34.60% |
| Graphite 10 | 5.9 | 3.9 | 0.70% | 34.20% |

The results show that the X/Y elongation of the graphite layer is decreased with the increase of the OI value of the graphite material before and after the circulation, and the Z elongation of the graphite layer is increased with the increase of the OI value of the graphite material before and after the circulation.

Table 2 shows the tensile strengths and the elongations of various substrates. When the traditional substrate (i.e., an electrolytic copper foil) has a tensile strength greater than 400 MPa, the elongation of the traditional substrate is usually relatively large (>2%). The high-strength substrate (i.e., a rolled copper foil) used in the present application has a high tensile strength (greater than 400 MPa) and low elongation (<2%).

TABLE 2

| Substrate | Tensile strength (MPa) | Elongation |
|---|---|---|
| Traditional substrate 1 (electrolytic copper foil) | 1100 | 2.5% |
| Traditional substrate 2 (electrolytic copper foil) | 480 | 3.2% |
| Traditional substrate 3 (electrolytic copper foil) | 490 | 3.3% |
| Traditional substrate 4 (electrolytic copper foil) | 1110 | 3.0% |
| Traditional substrate 5 (electrolytic copper foil) | 420 | 4.9% |
| High-strength substrate 6 (rolled copper foil) | 530 | 0.8% |
| High-strength substrate 7 (rolled copper foil) | 530 | 1.7% |
| High-strength substrate 8 (rolled copper foil) | 510 | 0.8% |
| High-strength substrate 9 (rolled copper foil) | 540 | 1.6% |
| High-strength substrate 10 (rolled copper foil) | 670 | 1.4% |

The anode was prepared according to the settings of all the embodiments and comparative embodiments in Table 3 below. The silicon mixtures 1, 2 and 3 were prepared by mixing silicon carbon containing 17 w % of silicon and graphite, and the formed mixture contained 3.5 w % of silicon. The silicon mixtures 1, 2 and 3 had different particle sizes. The particle size distribution of the silicon mixture 1 was: Dv10 3.5 μm, Dv50 8.1 μm, Dv90 25.4 μm and Dv99 51.0 μm. The particle size distribution of the silicon mixture 2 was: Dv10 4.7 μm, Dv50 12.1 μm, Dv90 28.9 μm and Dv99 46.4 μm. The particle size distribution of the silicon mixture 3 was: Dv10 3.7 μm, Dv50 7.9 μm, Dv90 16.2 μm and Dv99 23.8 μm. The lithium ion battery was prepared by adopting the above-mentioned anode, and the X/Y and Z elongations of the anode at the end of the circulation of the lithium ion battery were tested. The results are as shown in Table 3.

TABLE 3

| Embodiment S/Comparative Embodiments D | Anode Silicon mixture | Graphite | Substrate | Elongation X/Y | Z |
|---|---|---|---|---|---|
| D1 | 1 | — | 1 | 0.55% | 57.5% |
| S1 | 1 | 1 | 1 | 0.43% | 59.4% |
| S2 | 1 | 3 | 1 | 0.47% | 59.0% |
| S3 | 1 | 7 | 1 | 0.58% | 57.0% |
| S4 | 1 | 8 | 1 | 0.73% | 55.1% |
| S5 | 1 | 10 | 1 | 0.93% | 53.3% |
| D2 | 2 | — | 1 | 0.51% | 57.3% |
| S6 | 2 | 1 | 1 | 0.41% | 59.2% |
| S7 | 2 | 3 | 1 | 0.44% | 58.8% |
| S8 | 2 | 7 | 1 | 0.55% | 56.9% |
| S9 | 2 | 8 | 1 | 0.71% | 55.0% |
| S10 | 2 | 10 | 1 | 0.91% | 53.2% |
| D3 | 3 | — | 1 | 0.55% | 57.1% |
| S11 | 3 | 1 | 1 | 0.42% | 59.1% |
| S12 | 3 | 3 | 1 | 0.46% | 58.6% |
| S13 | 3 | 7 | 1 | 0.54% | 56.9% |
| S14 | 3 | 8 | 1 | 0.74% | 55.0% |
| S15 | 3 | 10 | 1 | 0.95% | 53.0% |
| D4 | 1 | — | 2 | 0.63% | 56.9% |
| S16 | 1 | 1 | 2 | 0.46% | 59.1% |
| S17 | 1 | 3 | 2 | 0.48% | 58.5% |
| S18 | 1 | 7 | 2 | 0.56% | 57.2% |
| S19 | 1 | 8 | 2 | 0.66% | 56.0% |
| S20 | 1 | 10 | 2 | 0.98% | 52.5% |
| D5 | 2 | — | 2 | 0.59% | 56.7% |
| S21 | 2 | 1 | 2 | 0.44% | 59.1% |
| S22 | 2 | 3 | 2 | 0.45% | 58.3% |
| S23 | 2 | 7 | 2 | 0.59% | 57.0% |
| S24 | 2 | 8 | 2 | 0.64% | 55.7% |
| S25 | 2 | 10 | 2 | 0.96% | 52.4% |
| D6 | 3 | — | 2 | 0.60% | 56.7% |
| S26 | 3 | 1 | 2 | 0.47% | 59.1% |
| S27 | 3 | 3 | 2 | 0.45% | 58.1% |
| S28 | 3 | 7 | 2 | 0.58% | 56.7% |
| S29 | 3 | 8 | 2 | 0.64% | 55.5% |
| S30 | 3 | 10 | 2 | 0.93% | 52.2% |
| D7 | 1 | — | 6 | 0.42% | 58.1% |
| S31 | 1 | 1 | 6 | 0.35% | 60.5% |
| S32 | 1 | 3 | 6 | 0.36% | 60.3% |
| S33 | 1 | 7 | 6 | 0.49% | 57.5% |
| S34 | 1 | 8 | 6 | 0.52% | 56.2% |
| S35 | 1 | 10 | 6 | 0.85% | 53.0% |
| D8 | 2 | — | 6 | 0.39% | 57.9% |
| S36 | 2 | 1 | 6 | 0.34% | 60.2% |
| S37 | 2 | 3 | 6 | 0.34% | 60.0% |
| S38 | 2 | 7 | 6 | 0.47% | 57.5% |
| S39 | 2 | 8 | 6 | 0.55% | 55.9% |
| S40 | 2 | 10 | 6 | 0.87% | 52.9% |
| D9 | 3 | — | 6 | 0.38% | 57.8% |
| S41 | 3 | 1 | 6 | 0.33% | 60.0% |
| S42 | 3 | 3 | 6 | 0.39% | 59.9% |
| S43 | 3 | 7 | 6 | 0.43% | 57.4% |
| S44 | 3 | 8 | 6 | 0.55% | 55.8% |
| S45 | 3 | 10 | 6 | 0.88% | 52.7% |
| S46 | 3 | 2 | 1 | 0.44% | 58.8% |

Figure 4:
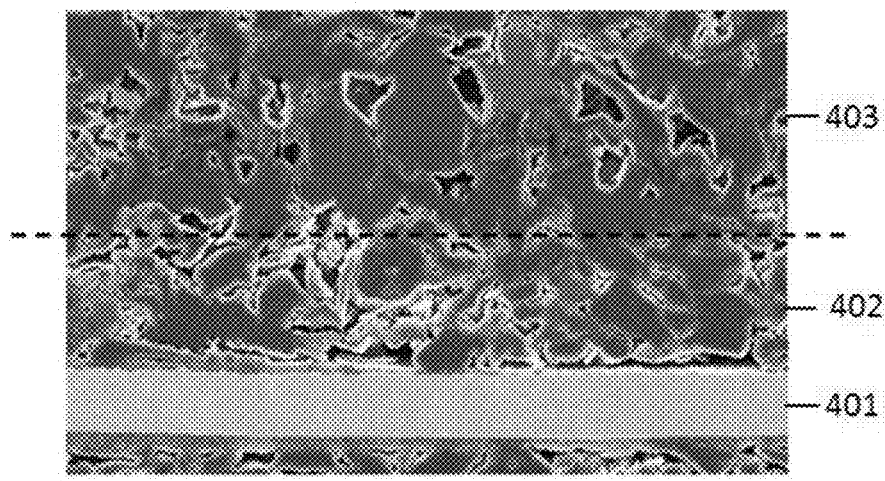
FIG. 4 shows a cross-sectional view of an anode according to an embodiment of the present application under a scanning electron microscope (SEM).
Figure 5:
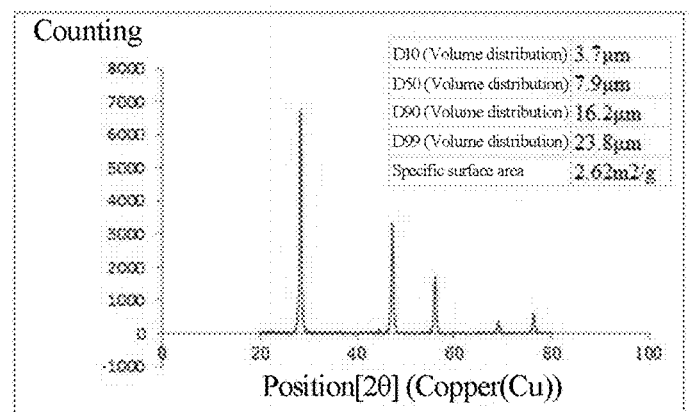
FIG. 5 shows an X-ray diffraction (XRD) pattern and particle size distribution of an upper layer of an anode according to an embodiment of the present application.
Figure 6:
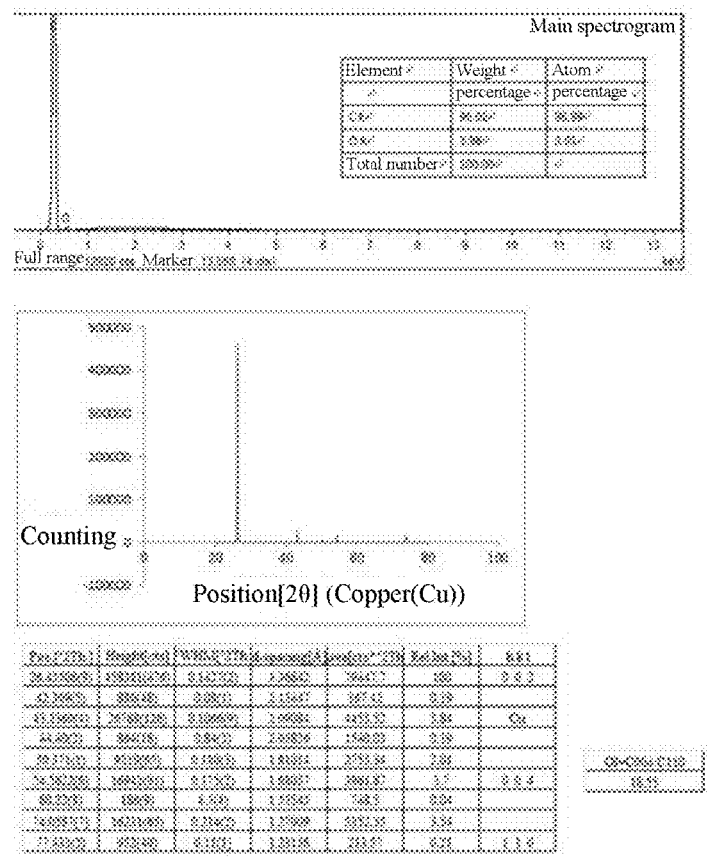
FIG. 6 shows an XRD pattern and particle size distribution of a lower layer of an anode according to an embodiment of the present application.

The results show that the graphite layer may be successfully applied between various silicon mixture layers and various substrates. Taking Embodiment S46 as an example, FIG. 4 shows the obtained anode, including a substrate 401, a graphite layer 402 and a silicon mixture layer 403. The upper layer (i.e., the silicon mixture layer 403) of the anode was scraped for XRD and tested for particle size, with the results shown in FIG. 5. The lower layer (i.e., the graphite layer 402) of the anode was scraped for XRD and tested for particle size, with the results shown in FIG. 6.

Data in Table 3 further shows that the use of the graphite layers (i.e., Graphite 1 and 3) having an OI value of greater than 15 between the silicon mixture and the substrate may obviously decrease the X/Y elongation of the anode, that is, the X/Y elongation is less than 0.5%. On the basis that the graphite layer having an OI value of greater than 15 is used, the traditional substrates (i.e., Substrates 1 and 2) are replaced by the high-strength substrate (i.e., Substrate 6) to further decrease the X/Y elongation of the anode, that is, the X/Y elongation is less than 0.4%.

Figure 7:
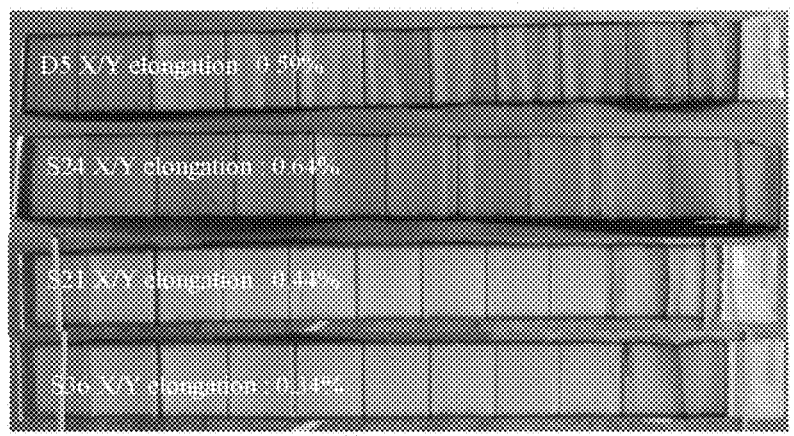
FIG. 7 shows anodes having different X/Y elongations after the circulation of the lithium ion battery.

FIG. 7 shows anodes after the circulation of the lithium ion batteries of Comparative Embodiment D5, Embodiment S24, Embodiment S21 and Embodiment S36. Results show that as shown by D5 and S24 in FIG. 7, when no graphite or the graphite having an OI value of less than 15 is used between the silicon mixture and the substrate, the anode is wrinkled and deforms. As shown by S21 in FIG. 7, when the graphite having an OI value of greater than 15 is used between the silicon mixture and the substrate, the wrinkling and deformation phenomena are obviously reduced. As shown by S36 in FIG. 7, after the substrate in S21 is replaced by the high-strength substrate, the wrinkling and deformation phenomena are further reduced.

By referring to "embodiments", "part of the embodiments", "an embodiment", "for another example", "for example", "for specific example" or "part of the examples" throughout the entire description, a meaning represented thereby is that at least one embodiment or example in the present application includes specific features, structures, materials or characteristics described in the embodiment or example. Therefore, descriptions appearing in all parts of the whole description, such as: "in some embodiments", "in the embodiments", "in one embodiment", "in another example", "in one example", "in the specific example" or "for example", do not necessarily refer to the same embodiments or examples in the present application. In addition, the specific features, structures, materials and characteristics herein may be combined in one or more embodiments or examples by any proper methods.

Although illustrative embodiments have been demonstrated and described, those skilled in the art should understand that the above-mentioned embodiments may not be explained as limitations to the present application, and can make changes, replacements and modifications to the embodiments without departing from the spirit, principle and scope of the present application.

What is claimed is:

1. An anode, comprising a substrate, an active material layer and a carbon coating layer between the substrate and the active material layer, wherein an X-ray diffraction pattern of the carbon coating layer comprises a 004 diffraction pattern and a 110 diffraction pattern; and a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15, wherein the active material layer is a silicon active material layer.

2. The anode according to claim 1, wherein the substrate comprises a tensile strength of greater than about 400 MPa and an elongation of less than about 2%.

3. The anode according to claim 2, wherein the substrate is selected from copper, nickel, a copper alloy, a nickel alloy or a combination thereof.

4. The anode according to claim 1, wherein the carbon coating layer is selected from natural graphite, artificial graphite, hard carbon, soft carbon or a combination thereof.

5. The anode according to claim 1, wherein the silicon active material layer comprises not less than about 0.1 w % of silicon.

6. An electrochemical apparatus, comprising:
a cathode; and
an anode comprising a substrate, an active material layer and a carbon coating layer between the substrate and the active material layer, wherein an X-ray diffraction pattern of the carbon coating layer comprises a 004 diffraction pattern and a 110 diffraction pattern; and a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15, wherein the active material layer is a silicon active material layer.

7. The electrochemical apparatus according to claim 6, wherein the substrate comprises a tensile strength of greater than about 400 MPa and an elongation of less than about 2%.

8. The electrochemical apparatus according to claim 7, wherein the substrate is selected from copper, nickel, a copper alloy, a nickel alloy or a combination thereof.

9. The electrochemical apparatus according to claim 6, wherein the carbon coating layer is selected from natural graphite, artificial graphite, hard carbon, soft carbon or a combination thereof.

10. The electrochemical apparatus according to claim 6, wherein the silicon active material layer comprises not less than about 0.1 w % of silicon.

11. The electrochemical apparatus according to claim 6, wherein the electrochemical apparatus is a lithium ion battery.

12. An electronic apparatus, comprising an electrochemical apparatus, comprising
a cathode; and
an anode comprising a substrate, an active material layer and a carbon coating layer between the substrate and the active material layer, wherein an X-ray diffraction pattern of the carbon coating layer comprises a 004 diffraction pattern and a 110 diffraction pattern; and a ratio C004/C110 of a c-axial length C004 of a unit crystal cell length obtained from the 004 diffraction pattern to an a-axial length C110 of a unit crystal cell length obtained from the 110 diffraction pattern is an OI value of the carbon coating layer, and the OI value is greater than about 15, wherein the active material layer is a silicon active material layer.

13. The electronic apparatus according to claim 12, wherein the substrate comprises a tensile strength of greater than about 400 MPa and an elongation of less than about 2%.

14. The electronic apparatus according to claim 13, wherein the substrate is selected from copper, nickel, a copper alloy, a nickel alloy or a combination thereof.

15. The electronic apparatus according to claim 12, wherein the carbon coating layer is selected from natural graphite, artificial graphite, hard carbon, soft carbon or a combination thereof.

16. The electronic apparatus according to claim 12, wherein the silicon active material layer comprises not less than about 0.1 w % of silicon.

\* \* \* \* \*